United States Patent [19]

Raad et al.

[11] Patent Number: 5,029,660
[45] Date of Patent: Jul. 9, 1991

[54] STEERING CONTROL METHOD AND CONTROL SYSTEM FOR WHEELED VEHICLES

[75] Inventors: Joseph M. Raad, Sterling Heights; Geoffrey F. Bridges, Belleville, both of Mich.

[73] Assignee: Ford Motor Company, Dearborn, Mich.

[21] Appl. No.: 505,749

[22] Filed: Apr. 6, 1990

[51] Int. Cl.[5] .............................................. B62D 5/06
[52] U.S. Cl. ................................ 180/143; 364/424.05
[58] Field of Search ............... 180/132, 141, 142, 143; 364/424.05

[56] References Cited

U.S. PATENT DOCUMENTS

| | | | |
|---|---|---|---|
| 3,874,407 | 4/1975 | Griswold | 137/596.17 |
| 4,354,224 | 10/1982 | Sato | 364/183 |
| 4,439,716 | 3/1984 | Minnich | 318/632 |
| 4,498,036 | 2/1985 | Salemka | 318/561 |
| 4,569,411 | 2/1986 | Morishita et al. | 180/142 |
| 4,619,338 | 10/1986 | Higashi et al. | 180/142 |
| 4,629,025 | 12/1986 | Brasier et al. | 180/142 |
| 4,639,651 | 1/1987 | Shimizu | 318/432 |
| 4,666,013 | 5/1987 | Shibahata et al. | 180/141 |
| 4,745,514 | 5/1988 | Takeshima et al. | 180/142 X |
| 4,789,041 | 12/1988 | Takeshima et al. | 180/142 |

FOREIGN PATENT DOCUMENTS 2205287 12/1988 United Kingdom ................ 180/142

Primary Examiner—Charles A. Marmor
Assistant Examiner—Kevin Hurley
Attorney, Agent, or Firm—Frank G. McKenzie; Keith L. Zerschling

[57] ABSTRACT

A feedback control method and system are provided to accurately control the steering assist level in a vehicle steering system. An electric actuator, such as a solenoid, operates a flow control valve that controls the flow of control fluid in a vehicle steering system in relation to driver and vehicle inputs such as vehicle speed and the angular position and velocity of a hand-wheel of the steering system. The flow of the control fluid is utilized by the steering system to provide a power assist steering force. A feedback signal based on the actual measured current of the solenoid is generated after a hardware filter filters the measured current. There is a time lag associated with the filtered feedback signal. A software filter filters an initial control signal which represents the desired steering assist level to maintain a similar time relationship between the feedback signal and the initial control signal. An error signal is generated by comparing the feedback signal and the filtered initial control signal. The initial control signal is then modified by the error signal to obtain a final control signal which compensates for varying system operating conditions.

15 Claims, 2 Drawing Sheets

STEERING CONTROL METHOD AND CONTROL SYSTEM FOR WHEELED VEHICLES

TECHNICAL FIELD

This invention relates to electronically controlled, variable-effort power steering methods and systems and, in particular, to electronically controlled, variable-effort power steering methods and systems which utilize the flow of a control fluid to provide a power assist steering force.

BACKGROUND ART

The prior art discloses an electronically controlled, variable-effort power steering system wherein the system varies the assist level by restricting the hydraulic fluid flow rate to a vehicle steering rack. Flow rate control is achieved by controlling the current through a solenoid valve which, in turn, operates a flow control valve through which the hydraulic fluid flows. Hydraulic fluid flow rate curves (such as flow rate vs. vehicle speed and steering wheel rotation rate) are typically defined during vehicle development and are incorporated in the software design of the vehicle's electronic control module or unit to generate corresponding current. U.S. Pat. No. 4,629,025 entitled "Flow Regulated Power Assist Steering System With Evasive Maneuver Capability" and issued Dec. 16, 1986 is an example of such prior art.

One problem with such prior art is that such control systems provide open-loop control of the solenoid valve. Consequently, there is no capability to modify or adjust the current control signals to the solenoid valve as defined by the hydraulic fluid flow rate curves programmed within the electronic control unit. The ability to modify the current control signal is highly desirable to compensate for changes in temperature and for variations in the coils of one actuator relative to another (for example, changes in electrical resistance). Variations also occur due to mechanical differences and other differences within the various solenoid valves.

Consequently, there is a need to accurately regulate the solenoid valve current over operating conditions including current fluctuations in the solenoid valve due to aging, variable battery voltage and temperature.

Closed loop feedback control systems are well known to correct system errors between desired output signals and actual outputs. For example, U.S. Pat. Nos. 4,639,651 and 4,666,013 disclose power steering systems which include feedback circuits. In the '651 patent armature current is fed to an electric motor which is used to provide power assist and is detected and fed back through an amplifier and a filter. The detected current is utilized in controlling a clutch for transmitting torque from the motor as an auxiliary torque to a steering output shaft.

In the '013 patent, sensed yaw rate or lateral acceleration is utilized as a feedback signal to modify the power assist signal delivered to an hydraulic assist cylinder.

U.S. Pat. No. 4,498,036 discloses an adaptive feedback system which determines an error signal representing the difference between an actual and a desired control factor in order to reduce the difference between the actual and desired levels. However, the system is not disclosed in combination with a power steering device.

Other U.S. patents of a more general interest include U.S. Pat. Nos. 3,874,407, 4,354,224 and 4,439,716.

SUMMARY OF THE INVENTION

An object of the present invention is to provide an electronically controlled, variable-effort power steering method and system to accurately control steering assist levels under a wide variety of varying system operating conditions.

Another object of the present invention is to provide an electronically controlled, variable-effort power steering method and system utilizing feedback control to thereby compensate for varying system operating conditions.

Yet still another object of the present invention is to provide an electronically controlled, variable-effort power steering method and system utilizing digital feedback control including an estimator to compensate for varying system operating conditions.

In carrying out the above objects and other objects of the present invention in a vehicle steering system including a handwheel, a method is provided for controlling a flow control valve and an electric actuator for operating the valve to control the flow of control fluid in the system. The flow of control fluid is utilized by the system to provide a power assist steering force. The method includes the step of generating an initial control signal, the initial control signal being representative of the power steering assist level desired. The method of the present invention is characterized by the steps of generating a feedback signal based on the actual current of the actuator and generating a final control signal as a function of the initial control signal and the feedback signal to control the actuator as a function of the actual current of the actuator to compensate for varying system operating conditions.

A control system for use in the vehicle steering system is also provided. The control system includes means for generating an initial control signal. The initial control signal is representative of the power steering assist level desired. An electric actuator is coupled to the flow control valve for operating the flow control valve as a function of a final control signal. The system is characterized by feedback means for generating a feedback signal representative of the actual current of the actuator and control means for generating the final control signal as a function of the initial control signal and the feedback signal to control the actuator as a function of the actual current of the actuator to compensate for varying system operating conditions.

The advantages occurring to the use of the method and system as described above are numerous. For example, the method and system are capable of accurately controlling the flow control valve and the electric actuator for operating the valve under various varying system operating conditions. Such conditions include temperature, battery voltage, resistance variations between coils of different actuators and mechanical differences. Such variations are compensated for to thereby accurately control steering assist level in a reliable and cost efficient fashion. A and system are particularly useful in electronically controlled power steering systems which are mass produced for automobiles.

The above advantages and other advantages and features of the present invention are readily apparent from the following detailed description of the invention when taken in connection with the accompanying drawings.

BEST MODE FOR CARRYING OUT THE INVENTION

Figure 1:
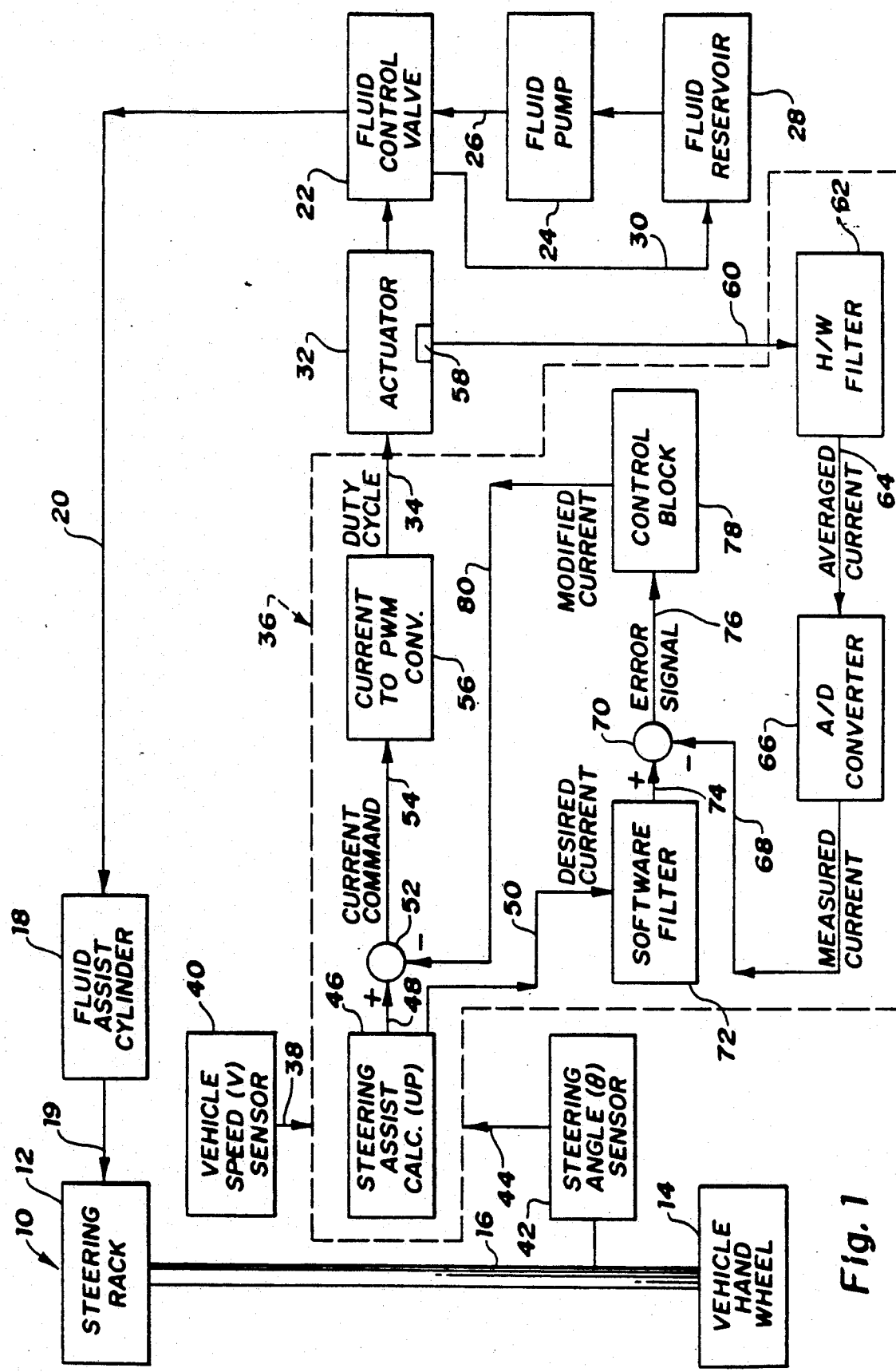
FIG. 1 is a generalized block diagram of the preferred system of the present invention.

Referring now to FIG. 1, there is illustrated a vehicle steering system generally indicated at 10. In particular, the steering system is preferably a motor vehicle hydraulically assisted rack and pinion steering system including a steering rack 12, a vehicle handwheel 14 which is connected through a shaft 16 to a pinion gear (not shown) which, in turn, engages corresponding gear teeth on the rack such that rotation of the handwheel 14 transmits linear motion to the rack 12 for steering wheels (not shown) of the vehicle.

The steering system 12 also includes a power or fluid assist cylinder 18 connected to the rack 12 via a rod 19 in a conventional fashion.

The mechanical and hydraulic elements of the steering system 10 are conventional. An example of such a combination of elements is illustrated in U.S. Pat. No. 4,428,450 to Stenstrom et al., issued Jan. 31, 1984.

A controlled flow of hydraulic fluid is supplied to the cylinder 18 along line 20 from a flow control valve 22. A pump 24 supplies pressurized hydraulic fluid to a line 26 from a fluid reservoir 28 with the valve 22 returning a controlled amount of the fluid to the reservoir 28 via a line 30 to regulate the flow supplied to the line 20. An example of such a flow control valve is described in U.S. Pat. No. 4,629,025 to Brasier et al, issued Dec. 16, 1986.

The position of the flow control valve 22 is controlled by a linear or current proportional actuator or solenoid 32. Preferably, the actuator 32 includes a ferromagnetic plunger movably disposed therein and a coil which is energized with electric current in the form of a final control signal appearing along line 34. The amount of current supplied to actuator 32 along line 34 determines the position of the plunger relative to a flow aperture in direct proportion to the current supply to the solenoid coil.

An electronic control unit or module, generally indicated at 36, controls the solenoid 32 which, in turn, controls the flow of control fluid in relation to driver and/or vehicle inputs such as the vehicle speed and the angular position and velocity of the handwheel 14 by controlling the amount of current supplied to the solenoid coil on line 34. The control unit 36 preferably includes a microcomputer.

The electronic control unit 36 receives a input representation of vehicle speed along line 38 from a vehicle speed sensor 40. Steering angle or angular position of the handwheel 14 is obtained from a digital steering angle sensor 42. The sensor 42 provides an angular position signal representative of the angular position of the handwheel 14 on a line 44.

At block 46, preferably a steering assist calculation is performed by generating an initial control value as a function of the digital representations of the angular position signal and the vehicle speed signal. Alternatively, an internal control signal could be generated. The initial control signal is determined from the hydraulic fluid flow rate curve previously stored (i.e. desired current signal which is a function of vehicle speed and steering wheel rotation velocity or rate). Calculation of handwheel velocity from handwheel position information can be carried out by computing the difference between the current handwheel position and a previously measured handwheel position, the time between such measurements being substantially constant. However, preferably handwheel velocity is determined through the use of a digital filter.

An initial control signal appears on lines 48 and 50 and represents the value for the desired current determined in the steering assist calculation block 46. As is described in greater detail hereinbelow, the control signal appearing on line 48 is modified at a junction block 52 to compensate for changes in temperature and for variations in the coils of one actuator or solenoid relative to another (e.g. changes in electrical resistance). Variation changes may also occur due to mechanical differences and other differences of the actuator 32.

The current command signals on line 54 is converted to a pulse width modulated (PWM) duty cycle signal at block 56. The duty cycle signal is then output on line 34 for input into the coil of the solenoid 32.

The current of the actuator 32 is a pulse width modulated signal which is measured by a sensor 58 to provide a measured current signal along line 60. This signal is filtered by a low pass analogue hardware filter 62 which comprises an RC circuit to not only eliminate noise from the signal, but also to average the current signal on line 64. The averaged current has a time lag associated with it due to the hardware filter 62. The averaged current signal operating on line 64 is provided to an A/D converter 66 of the electronic control unit 36 to obtain an digital measured current value on line 68. The value of the measured current is provided to a summing point or comparator 70 which compares the measured current value appearing on line 68 with a digitally filtered signal provided by a software filter block 72 along line 74.

The software filter block 72 takes the desired current command signal appearing on line 50 and introduces the same time lag or delay that was introduced by the hardware filter 62 into the digitally filtered signal on line 74. The software filter block 72 introduces similar filtering characteristics to the initial control signal as those introduced by the hardware filter 62 to the feedback signal. In this way, the software filter 72 is matched to the hardware filter 62.

An error signal on line 76 results from comparing the output of the software filter 72 appearing on line 74 with the measured current value appearing on line 68. The error signal 76 is utilized by a control block 78 to provide a modified current signal along line 80 which, in turn, is combined with the desired or initial control signal appearing on line 48 by the junction block 52. The control block 78 preferably comprises a P-I-D (proportional-integral-derivative) digital controller or compensator which insures that the current through the actuator 32 accurately follows the desired current over all system operating conditions.

Figure 2:
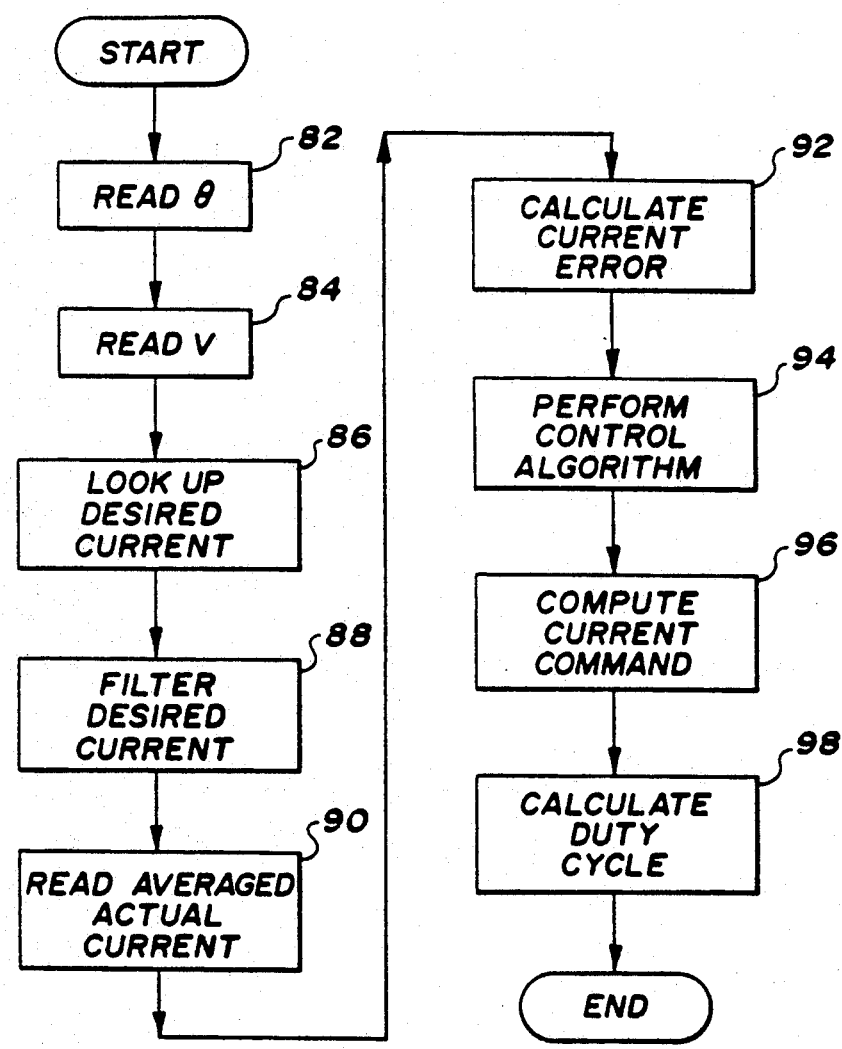
FIG. 2 is a flow chart of the preferred method of the present invention.

Referring now to FIG. 2, there is disclosed the control algorithm which is utilized by the electronic control unit 36 to generate the final control signal along line 34 to the actuator 32.

Initially, steering angle provided by the steering angle sensor 42 is read at block 82.

At block 84, the electronic control unit 36 reads vehicle velocity as provided by the vehicle speed sensor 40.

At block 86, the desired current for providing the desired amount of power assist steering force is looked up (i.e. by utilizing consecutive readings from the steering angle sensor 42 and the vehicle speed) from the hydraulic fluid flow rate curves which, as previously mentioned, are stored in the electronic control unit 36.

At block 88, the desired current is filtered by the estimator or software filter 72.

At block 90, the electronic control unit 36 reads the averaged actual current through the actuator 32 at the A/D converter 66 after the measured current through the actuator 32 has passed through the hardware filter 62 to obtain the averaged current along line 64.

At block 92, current error signal is calculated by comparator 70 to obtain the error signal appearing on line 76.

At block 94, the control algorithm of the control block 78 is performed preferably in-the form of a P-I-D digital controller. This ensures that the current through the actuator 32 accurately follows the desired current over all system operating conditions.

At block 96, the current command signal which appears on line 54 is computed at comparator 52 (i.e. by modifying the initial desired current control signal).

Finally, at block 98, a duty cycle PWM signal is calculated as illustrated at block 56 which signal is output on line 34 to the actuator 32.

The method and system of the invention described above provide numerous advantages. For example, by providing a closed loop system, the steering assist level is accurately controlled by accurately regulating the solenoid valve current over all operating conditions such as current fluctuation due to aging, battery voltage and temperature. Other varying system operating conditions include variations in the coils of one actuator relative to another and variations which occur due to mechanical differences and other differences. Consequently, there is no need to modify the previously stored hydraulic fluid flow rate curves defined during vehicle development and incorporated in the electronic control unit 36 to generate the corresponding desired current utilized to provide a power assist steering force.

The invention has been described in an illustrative manner and, it is to be understood that, the terminology which has been used is intended to be in the nature of words of description rather than of limitation. Many modifications and variations of the present invention are possible in light of the above teachings.

It is, therefore, to be understood that, within the scope of the appended claims, the invention may be practiced otherwise than as specifically described.

We claim:

1. In a vehicle steering system including a handwheel, a method for controlling a flow control valve and an electric actuator for operating the valve to control a flow of control fluid in the vehicle steering system, the flow of control fluid being utilized by the system to provide a power assist steering force, the method comprising steps of: generating an initial control signal, the initial control signal being representative of a power steering assist level desired, wherein the improvement comprises:

generating a feedback signal based on actual current of the electric actuator, said step of generating the feedback signal including steps of measuring the actual current and averaging the measured actual current to obtain an average current signal representative of average current through the actuator; and generating a final control signal as a function of the initial control signal and the feedback signal to control the electric actuator as a function of the actual current of the electric actuator to compensate for varying system operating conditions.

2. The method of claim 1 wherein the step of generating the final control signal includes the step of filtering the initial control signal.

3. The method of claim 2 wherein the average current signal has a time lag and wherein the filtered initial control signal has a time lag substantially equal to the time lag of the average current signal.

4. The method of claim 3 wherein the average current signal is an analog signal and the initial control signal is digitally filtered by the step of filtering and wherein the method further comprises the step of converting the analog average current signal to a digital average current signal.

5. The method of claim 4 further comprising steps of comparing the digitally filtered initial control signal and the digital average current signal to obtain an error signal and modifying the initial control signal as a function of the error signal.

6. The method of claim 5 wherein the step of modifying includes a step of generating a modified error signal based on the error signal to ensure that the actual current through the actuator accurately follows the initial control signal over the varying system operating conditions.

7. The method of claim 6 wherein the step of generating the final control signal includes a step of converting the modified initial control signal to a pulse width modulated final control signal.

8. In a vehicle steering system including a handwheel, a control system for controlling a flow control valve to control a flow of control fluid in the steering system, the flow of control fluid being utilized by the steering system to provide a power assist steering force, the control system including means for generating an initial control signal to control the control valve, the initial control signal being representative of a power steering assist level desired; an electric actuator coupled to the fluid control valve for driving the flow control valve as a function of a final control signal, wherein the improvement comprises:

feedback means for generating a feedback signal representative of actual current of the actuator, said feedback means including current averaging means coupled to the actuator for providing an average current signal representative of average current through the actuator; and control means for generating the final control signal as a function of the initial control signal and the feedback signal to control the actuator as a function of the actual current of the actuator to compensate for varying system operating conditions.

9. The control system of claim 8 wherein the control means includes first filter means for filtering the initial control signal.

10. The control system of claim 9 wherein said current averaging means includes second filter means for eliminating noise in the average current signal and wherein the current averaging means introduces a time lag in the average current signal, said first filter means being matched to the second filter means to introduce a time lag in the filtered initial control signal substantially equal to the time lag of the average current signal.

11. The control system of claim 10 wherein the average current signal is an analog signal and further comprising a converter circuit for converting the analog average current signal to a digital feedback signal representative of the actual current of the actuator.

12. The control system of claim 11 further comprising comparator means for comparing the digitally filtered signal and the digital feedback signal to obtain an error signal.

13. The control system of claim 12 further comprising modifying means for modifying the initial control signal as a function of the error signal.

14. The control system of claim 13 wherein said modifying means includes digital compensator means for generating a modified current based on the error signal to ensure that the actual current through the actuator accurately follows the initial control signal over the varying system operating conditions.

15. The control system of claim 14 further comprising converting means for converting the modified initial control signal to a pulse width modulated final control signal.

* * * * *